(12) United States Patent
Beyer

(10) Patent No.: US 11,910,368 B2
(45) Date of Patent: Feb. 20, 2024

(54) DYNAMICALLY CAPTURING LOCATION AT NETWORKS IN MOTION

(71) Applicant: HEWLETT PACKARD ENTERPRISE DEVELOPMENT LP, Houston, TX (US)

(72) Inventor: Ian Beyer, Clay Center, KS (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 150 days.

(21) Appl. No.: 17/144,037

(22) Filed: Jan. 7, 2021

(65) Prior Publication Data

US 2022/0217719 A1 Jul. 7, 2022

(51) Int. Cl.
*H04W 72/0453* (2023.01)
*H04W 64/00* (2009.01)
*G06N 20/00* (2019.01)
*H04W 24/08* (2009.01)
*H04W 84/00* (2009.01)

(52) U.S. Cl.
CPC ........ *H04W 72/0453* (2013.01); *G06N 20/00* (2019.01); *H04W 24/08* (2013.01); *H04W 64/003* (2013.01); *H04W 84/005* (2013.01)

(58) Field of Classification Search
CPC ............. H04W 72/0453; H04W 24/08; H04W 64/003; H04W 84/005; G06N 20/00
See application file for complete search history.

(56) References Cited

U.S. PATENT DOCUMENTS

| 9,185,603 B1* | 11/2015 | McCarthy | H04W 28/20 |
| 2015/0071268 A1* | 3/2015 | Kennedy | H04W 8/08 |
| | | | 370/338 |
| 2015/0355334 A1* | 12/2015 | Stubbs | G01S 19/14 |
| | | | 342/357.395 |
| 2018/0349086 A1* | 12/2018 | Chakra | H04W 64/00 |
| 2019/0149417 A1* | 5/2019 | Augusto Lopes | H04L 41/0886 |
| | | | 370/254 |
| 2021/0116907 A1* | 4/2021 | Altman | H04W 4/44 |
| 2021/0120523 A1* | 4/2021 | Hegde | H04W 72/0473 |
| 2022/0129913 A1* | 4/2022 | Yang | G06N 5/022 |

* cited by examiner

*Primary Examiner* — Jae Y Lee
(74) *Attorney, Agent, or Firm* — Sheppard Mullin Richter & Hampton LLP

(57) ABSTRACT

Systems and methods of controlling a mobile network include processors and memory storing instructions that cause the processors to perform receiving, from an external source or receiver, dynamically updated location data of a controller of the mobile network; determining, based on the dynamically updated location data, one or more permitted radiofrequency (RF) channels through which RF signals are transmitted from a mobile access point associated with the mobile network and traffic data corresponding to the permitted radiofrequency channels; and adjusting a frequency behavior of the mobile access point based on the permitted RF channels and the traffic data.

20 Claims, 10 Drawing Sheets

DYNAMICALLY CAPTURING LOCATION AT NETWORKS IN MOTION

DESCRIPTION OF RELATED ART

Currently, location tracking on wireless and wired edge networks is limited to static data. Thus, such location tracking is not suitable for mobile networks because as a mobile network moves, it would not have updated location information. Such a deficiency may result in violating local regulations such as radio and data privacy regulations as the mobile network enters a new location, and broadcasting inaccurate information to client devices accessing the mobile network.]

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
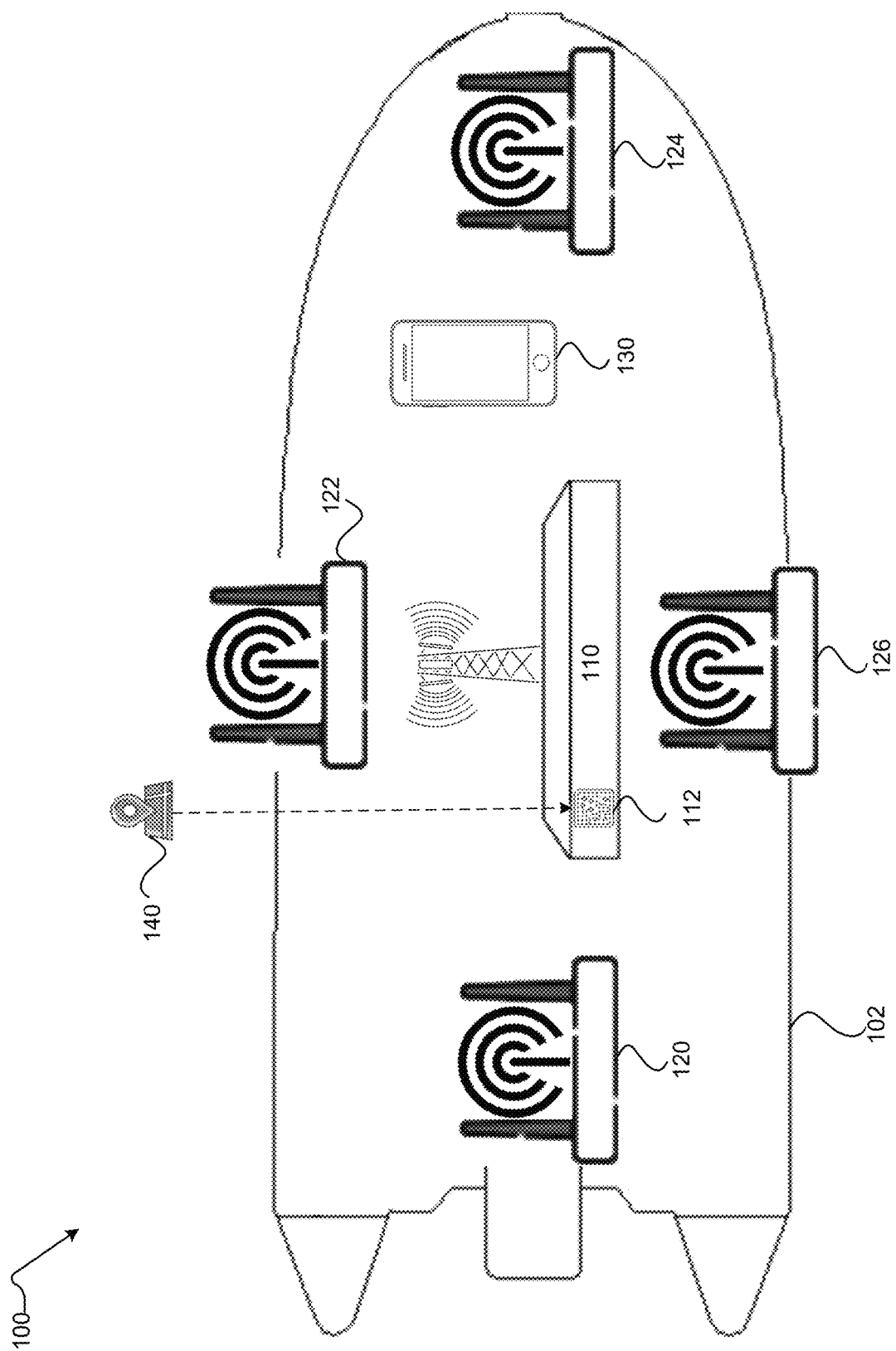
FIGS. 1A-1E are exemplary illustrations of a computing system that receives dynamically updated location data, according to embodiments described in the present disclosure.

The figures are not exhaustive and do not limit the present disclosure to the precise form disclosed.

DETAILED DESCRIPTION

The advent of pervasive mobile networks has increased a range of access to networks, providing network access in hitherto unattainable environments, such as, aboard mobile entities including ships, aircraft, trains, trucks, passenger vehicles, and even spacecraft. Here, mobile networks may be understood to refer to any network deployed in such a manner that it is able to move to different places, and should not be construed as limited to cellular networks. However, current techniques of acquiring location information, at an infrastructure level of mobile networks, are limited to static input or detection of location information, for example, set at a beginning of a period of time, trip, or voyage. Because this location information is not updated, a network controller of a mobile network may have out-of-date location information or no information at all. As a result, the network controller may not be updated once it has crossed into a border of another territory, thus preventing the network controller from adapting its radio behavior to conform with different rules in that territory. In addition, the network controller may be unable to broadcast up-to-date location information to client devices accessing the network.

Embodiments described herein address this dearth of up-to-date location information by dynamically updating a location, at an infrastructure level of a network controller and at one or more access points that serve as gateways to connect to a network, such as a wireless network or a wired network including a wired edge network. The dynamically updated location is not just manually inputted, but is from a validated source such as Global Navigation Satellite System (GNSS) satellites. As a result, the network controller would dynamically adapt to changes in radio regulations, for example, upon entering a different territory having different regulations, dynamically change radiofrequency (RF) behavior upon approaching or entering into an area in which certain frequencies are congested, and/or enhance tracking and navigation of current locations of the mobile entities, while enhancing a robustness and performance of the network and navigation. The network controller may acquire or obtain information regarding which frequencies are congested based on previously acquired geotagged data on congestion conditions. The network controller may also obtain navigation information from map data including high definition (HD) maps from cameras and/or satellite imagery. The map data may be stored in a cloud platform and/or may be downloaded and stored locally onto the controller 110. Because the network controller dynamically updates its location, and the map data also includes latitude and longitude coordinates, the network controller may be able to select a relevant portion of the map data in a neighboring region to the current dynamically updated location, which may be within a radius of the current dynamically updated location. Thus, the network controller may be able to determine a relevant portion of the map data at each specific instance in time.

FIG. 1A is an exemplary illustration of an exemplary environment 100 in a moving entity 102, in which a controller 110 of a network may dynamically update a location of the moving entity, more specifically, a longitude, latitude, and/or altitude position of the controller 110. In FIG. 1A, the moving entity 102 is illustrated as a ship as only an exemplary embodiment. The moving entity 102 may be a ship, such as a passenger ship, military ship, merchant ship, private ship such as a yacht, or cruise ship, aircraft, train, truck, passenger vehicle, or spacecraft. The controller 110 may obtain up-to-date location data from any suitable external source. In FIG. 1A, the controller 110 is illustrated to include an embedded GNSS chip 112 that obtains location data from Global Position Satellite System (GPS) satellites 140. The controller 110 may, alternatively or additionally, obtain location data from another external data source or external receiver such as a navigation system including GPS, Galileo, other satellite based systems, other devices in the infrastructure such as access points that have suitable receivers and visibility to the GNSS constellations, other edge devices, and/or an inertial navigation system (INS). In such a scenario, the controller 110 may obtain location data in a wireless manner, such as via a serial connection, or in a wired manner such as via a vehicle data bus. In some implementations, Any suitable protocol, such as Controller Area Network (CAN), Local Interconnect Network (LIN), Vehicle Area Network (VAN), and Multifunction Vehicle Bus, may be utilized to obtain location data in a wired manner. The location data may include, in addition to the longitude, latitude, and/or altitude position of the controller 110, odometry data such as an orientation and velocity in linear and/or angular terms, and roll, pitch, and yaw of the moving entity 102. Here, the location data may refer to location data of the controller 110. To determine a location of access points, which may be especially applicable on a large vehicle such as a large vessel, the controller 110 can compute respective offsets from the controller 110 to the different access points.

Once the controller 110 obtains or updates its location data, the controller 110 may transmit the updated location data to access points 120, 122, 124, and/or 126 disposed on the moving entity 102. Although only four access points are shown for purposes of illustration, any number of access points may be disposed on the moving entity 102. The access points may be disposed on an outside or an interior of the moving entity 102. Any one or more of the access points may themselves include an embedded GNSS chip that obtains location data from GPS satellites, or obtain location data from another external data source or external receiver. However, the access points located in an interior of the moving entity 102 may be shielded from receiving satellite signals, and thus may rely on the controller 110 to obtain updated location data. The access points 120, 122, 124, and/or 126 may determine their own locations based on the updated location data transmitted from the controller 110 and relative respective distances and orientations between the respective access points 120, 122, 124, and/or 126 and the controller 110. Thus, a location field of the access points 120, 122, 124, and/or 126 may be configured as relative to updated location data of controller 110 and based on heading information from the external data source providing the updated location data. The controller 110 may further broadcast updated location data to one or more client devices accessing the network regulated by the controller 110, such as client device 130, via a beacon. The client device 130 may, additionally or alternatively, obtain updated location data from one of the access points 120, 122, 124, and/or 126 such as the access point 124, which is an access point nearest the client device 130 out of all access points in the moving entity 102. By obtaining dynamically updated location data, the client device may then be able to perform indoor blue dot navigation. Further details of the controller 110 will be described with respect to the FIGS. below.

Figure 1B:
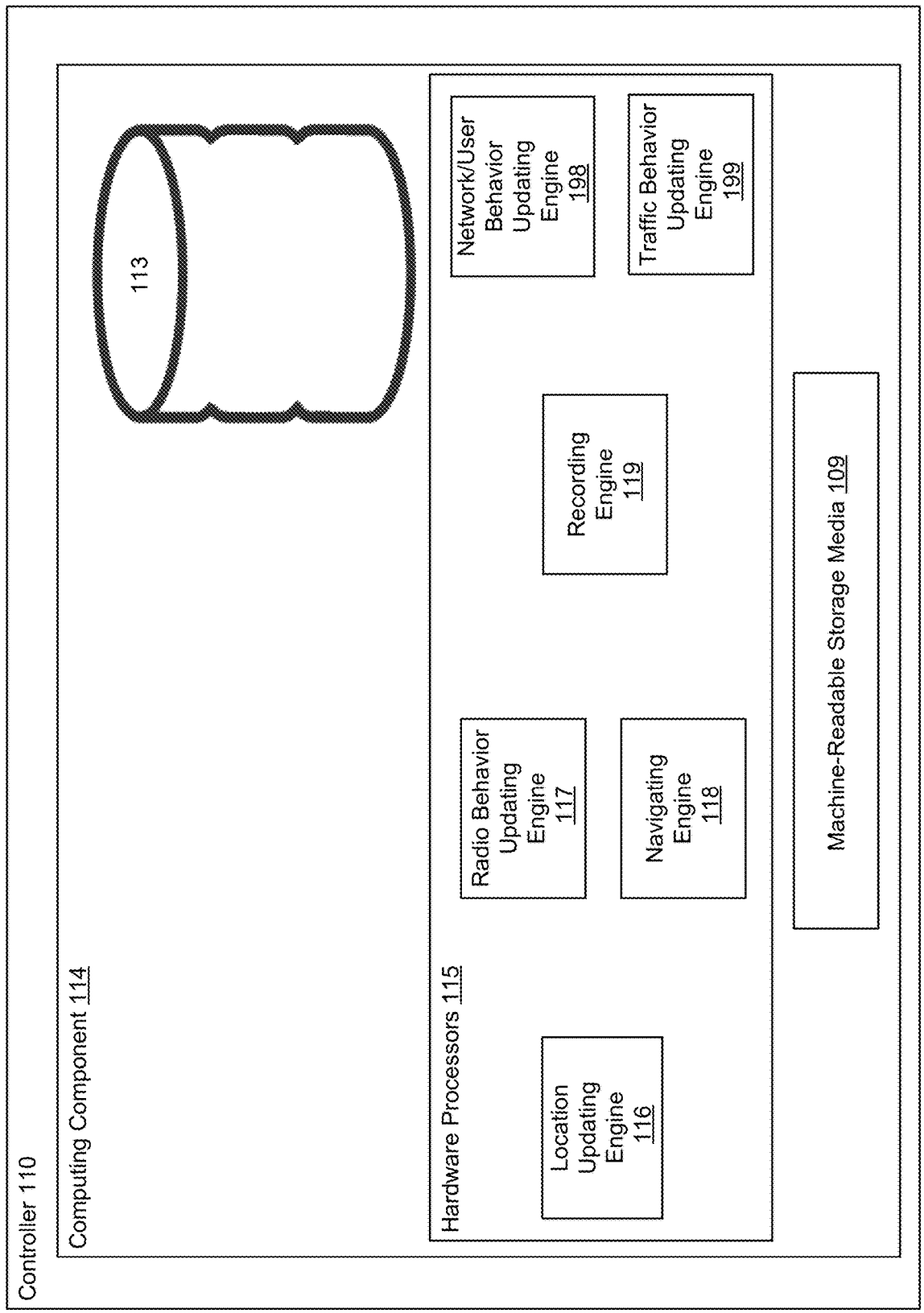

FIG. 1B illustrates additional details of the controller 110, which may include a database 113, a computing component 114, one or more hardware processors 115 and machine-readable storage media 109 storing a set of machine-readable/machine-executable instructions that, when executed, cause the hardware processor(s) 115 to perform functions of a location updating engine 116, a radio behavior updating engine 117, a navigating engine 118, a recording engine 119, a network/user traffic behavior updating engine 198, and/or a privacy behavior updating engine 199, without limitation. The radio behavior updating engine 117, the navigating engine 118, the recording engine 119, the network/user traffic behavior updating engine 198, and the privacy behavior updating engine 199, may perform functions that result in enhancements of network access, allocation, and tracking, to name a few benefits, made possible by the dynamically updated location data from the location updating engine 116, as alluded to in FIG. 1A. The controller 110 may obtain the location data at a rate (e.g., sampling rate) depending on a mode and/or velocity of transportation of the moving entity 102. For example, if the moving entity 102 is ground-based, an exemplary frequency of updating the location data may be 10 Hz. If the moving entity is air-based, the frequency of updating the location data may be higher. The rate of updating the location data may also depend, or be based on, whether a particular region at which the moving entity 102 is located is near a territorial border, or at which radio regulations and/or conditions are likely to change. For example, if the moving entity 102 is close to, or within a threshold distance of, a border between two countries that have different radio regulations, the rate of updating the location data may be increased. Alternatively or additionally, if the moving entity 102 is close to, or within a threshold distance of, a region that has a high probability or likelihood of congestion, interference, noise, and/or outage in certain frequency bands (e.g., radiofrequencies permitted by regulations), the rate of updating the location data may be increased by the location updating engine 116. Such regions may include regions near a port.

A probability or likelihood of congestion, interference, noise, and/or outage may be determined or inferred, for example, by a machine learning model. The machine learning model may be trained using a training dataset that includes previous traffic data, including data related to congestion, interferences, noise, usage, and/or outage of frequency channels in that particular region, and a second training dataset including trends and/or cyclical patterns of the aforementioned previous data. Thus, the machine learning model may incorporate not only previous data but also recent trends, for example, if a certain frequency range has been experiencing increased usage. This increased usage may be due to seasonal or economic changes. The inputs to the machine learning model may include particular locations or regions, while the outputs to the machine learning model may include an inferred probability at the respective locations or regions. The inferred probability may further be used to determine, for example, whether certain problems are associated with certain types of regions, such as regions near a port, or certain types of conditions, such as weather conditions. Thus, the inferred probabilities may be helpful in troubleshooting problems and identifying whether particular types of problems are localized to particular locations. The inferred probabilities may be stored or cached locally at the controller 110, or stored in a centralized monitoring and management platform, which may be, for example, a cloud platform, and downloaded by the controller 110.

The location updating engine 116 may transmit the obtained updated location data to the access points 120, 122, 124, and 126, and/or confirm any updated location data from the access points 120, 122, 124, and/or 126 as a sanity check. If the updated location data from one or more of the access points 120, 122, 124, and 126 deviate from the updated location data from the controller 110, such a deviation may be logged, by the recording engine 145, into the database 113, so that the location updating engine 116 may determine whether an external source of location data is faulty and should be discarded or disregarded. Additionally, in a scenario in which both the access points 120, 122, 124, and/or 126, as well as the controller 110, try to obtain updated location data, even if one source of updated location data becomes inaccessible, a backup source can still generate updated location data.

Figure 1C:
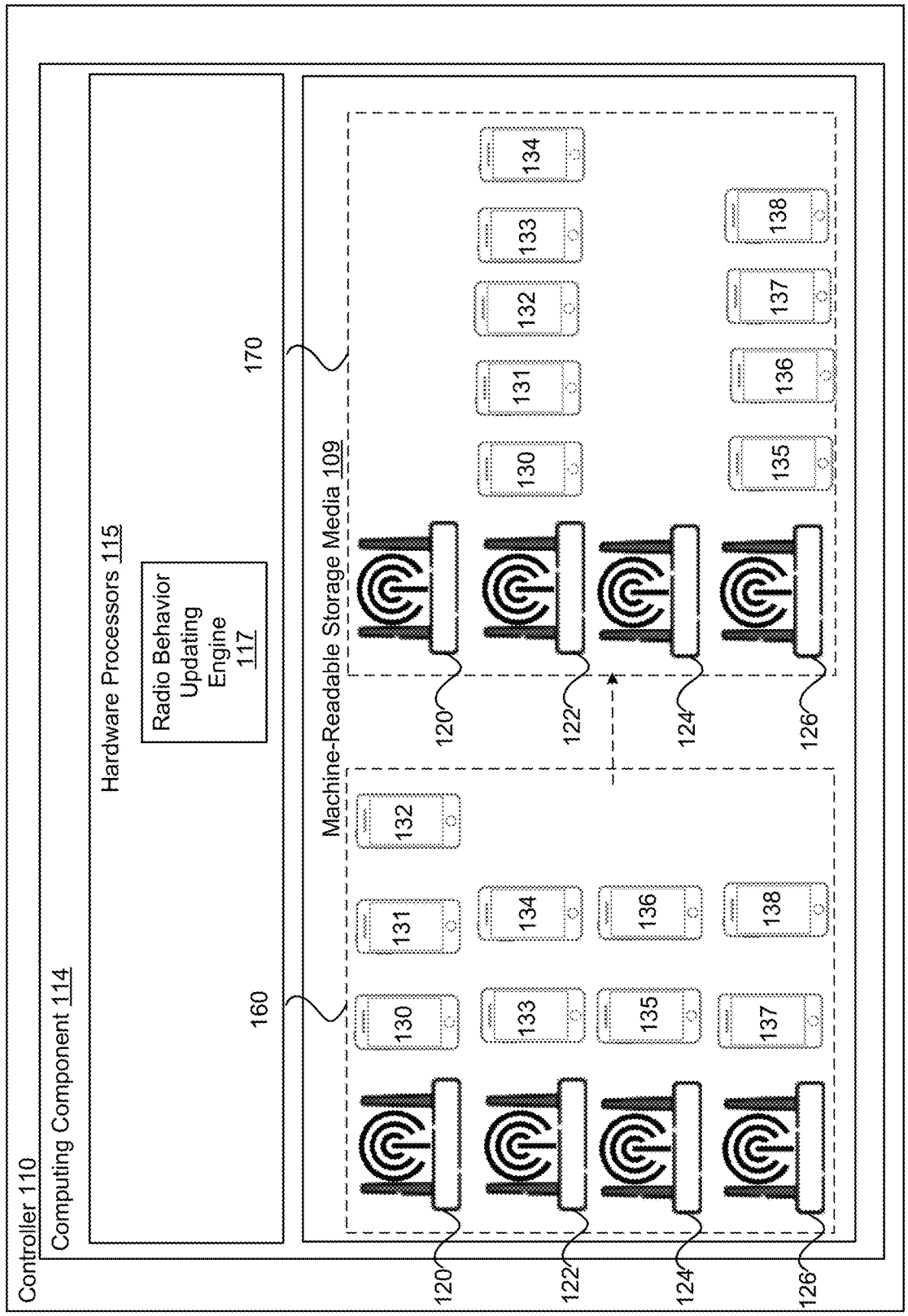

The radio behavior updating engine 117 may update a radio behavior and/or signal transmission behavior in one or more of the access points 120, 122, 124, and 126 from the updated location data. In some embodiments, the radio behavior updating engine 117 may include geofences programmed such that the radio behavior updating engine 117 updates the radio behavior of the one or more of the access points 120, 122, 124, and 126 upon entering a particular territory, such as crossing a border into a country. Each country, territory, or other demarcation may include a specific radio profile defining the radio behavior of the one or more access points 120, 122, 124, and 126. In some embodiments, the radio behavior updating engine 117 may include geofences programmed such that the radio behavior updating engine 117 updates the radio behavior of the one or more of the access points 120, 122, 124, and 126 upon being within a threshold distance of a port, in order to minimize a level of interference with other moving entities and/or with wireless or wired systems of the port. As an example, the updating of the radio behavior may include, terminating signal transmission in one or more frequency channels that were previously used in one or more of the access points 120, 122, 124, and 126, turning off or decreasing a signal power from one or more of the access points 120, 122, 124, and 126, such as, access points on an exterior of the moving entity 102 that have a probability of being detected (e.g., by an antenna) that exceeds a threshold probability. The radio behavior updating engine 117 may reallocate devices to different access points, such that a connection between the devices is established by different access points, as illustrated in FIG. 1C. As another example, the radio behavior updating engine 117 may adjust a radio behavior of one or more of the access points 120, 122, 124, and 126 based on an actual or predicted congestion, interference, noise, and/or outage in certain frequency bands.

Referring to FIG. 1C, the machine-readable storage media 109 storing a set of machine-readable/machine-executable instructions that, when executed, cause the hardware processor(s) 115 to perform functions of the radio behavior updating engine 117 in reallocating a subset of client devices including the client device 130, and client devices 131, 132, 133, 134, 135, 136, 137, and 138, to different access points 120, 122, 124, and 126. As alluded to previously, one or more of the access points 120, 122, 124, and 126 may stop transmitting radiofrequencies of a particular spectral range, or all radiofrequencies, due to territorial regulations, congestion, interference, noise, and/or outage. The radio behavior updating engine 117 may reassign some or all of the client devices 130-138 previously assigned to an access point that partially or entirely stopped transmitting radiofrequencies to a different access point. In this manner, the client devices 130-138 would all maintain access to the network. The reassignment may further be based on a load and a capacity of each of the access points 120, 122, 124, and 126 and/or which radiofrequencies have a highest probability of avoiding congestion, interference, noise, and/or outage in that particular region. The access points 120, 122, 124, and 126 operating in radiofrequencies that have a highest probability of avoiding congestion, interference, noise, and/or outage may be selected as a gateway to provide network access to more client devices compared to access points that have a lower probability of avoiding congestion, interference, noise, and/or outage.

For example, in a previous allocation 160, the client devices 130, 131, and 132 may have been assigned to the access point 120, the client devices 133 and 134 to the access point 122, the client devices 135 and 136 to the access point 124, and the client devices 137 and 138 to the access point 126. In a new allocation 170, due to the access points 120 and 124 no longer transmitting radiofrequencies, the client devices 130, 131, and 132 may be reassigned to the access point 122 and the client devices 135 and 136 reassigned to the access point 124.

Figure 1D:
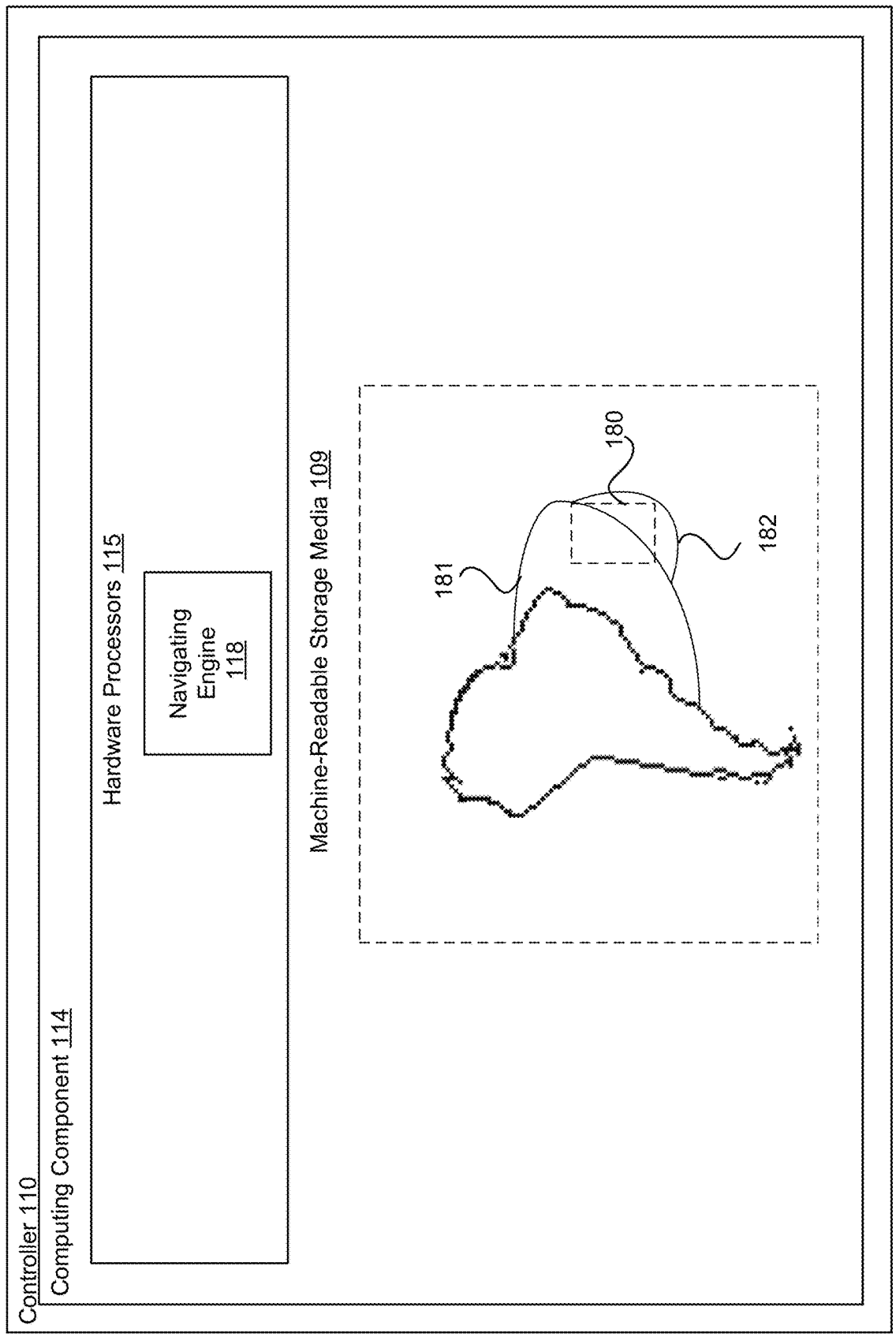

Additionally or alternatively to the radio behavior updating engine 117 updating a radio behavior of the access points 120, 122, 124, and 126, the navigating engine 118 may define a navigation path, or change a previously defined navigation path, based on the updated location data from the location updating engine 116 and/or based on a number of devices that are to be connected at the access points 120, 122, 124, and 126. As an illustrative example, if the moving entity 102 is approaching a region having a high probability of congestion, interference, noise, and/or outage, that exceeds a threshold, or a region having more restrictive radiofrequency transmission regulations, the navigating engine 118 may define or redefine a navigation path in order to avoid that region. The navigating engine 118 may redefine a navigation path if some of the access points 120, 122, 124, and 126 would be terminated from transmitting radiofrequencies along an original navigation path, and the client devices 130-138 cannot be reallocated effectively among the remaining access points. As illustrated in FIG. 1D, the navigating engine 118 may redefine or reroute an original navigation path 181 to an updated navigation path 182 in order to avoid a region 180 that is known to have, or has a probability exceeding a threshold of, congestion, interference, noise, and/or outage.

Figure 1E:
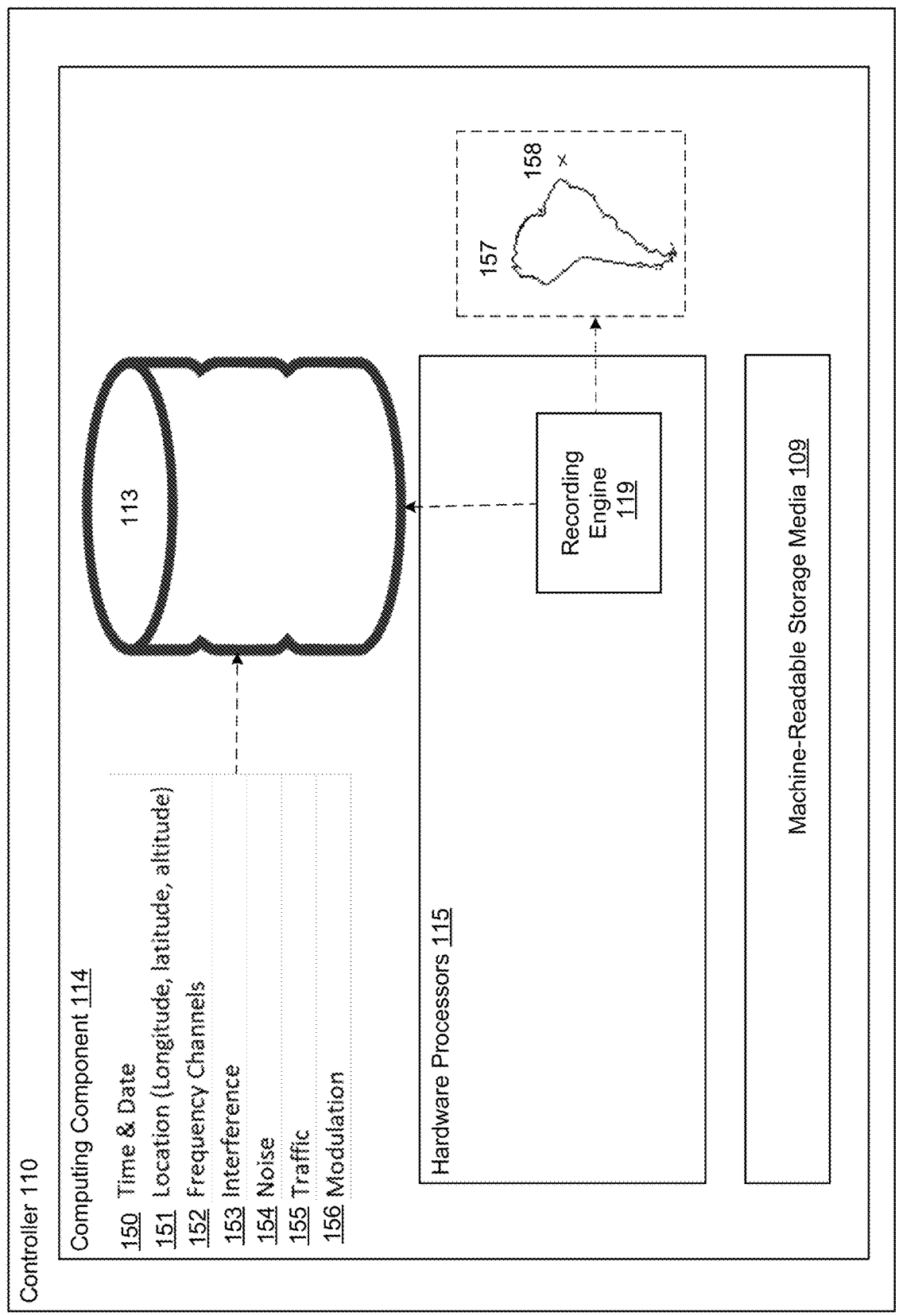

The recording engine 119 may detect current overall radiofrequency behaviors of all users at a particular location, including changes in radiofrequency behaviors and record or log such changes in the database 113 in order to detect regions that have a potentially high probability of congestion, interference, noise, and/or outage. In some examples, the recording engine 119 may detect radar signals that are to be protected against interference from 5 GHz radios under a Dynamic Frequency Selection (DFS) channel allocation scheme. In other examples, the recording engine 119 may determine whether any licensed users are operating in the 6 GHz band. Additionally, the recording engine 119 may record a type of modulation at the one or more frequency channels, such as, a pulse modulation, in order to detect a presence of radar. The recording engine 119 may transmit data of current radiofrequency behaviors to the radio behavior updating engine 117 and/or the navigating engine 118 so that the radio behavior updating engine 117 and/or the navigating engine 118 can implement changes such as location-based frequency coordination, to avoid interference with other users, based on the current radiofrequency behaviors. In addition, as alluded to with reference to the location updating engine 116, the recording engine 119 may transmit, to the location updating engine 116, As shown in FIG. 1E, the recording engine 119 may record, in the database 113, data associated with each change in radiofrequency behaviors. The data may include a date and time 150, a location 151 in terms of longitude, latitude, and altitude, one or more frequency channels 152 affected, and whether the change was a result of a level of interference 153, a level of noise 154, and/or a level of traffic 155, which may include, for example, a received signal and/or data throughput. The recording engine 119 may record a level of the interference 153, a level of the noise 154, and a level of the traffic 155. Such data may be obtained at an infrastructure level from the network controller and/or at the one or more access points. The database 113, in some examples, may include data from other moving entities, also captured at an infrastructure level, so that as different moving entities, such as a fleet, travel through a region, the different moving entities may share radiofrequency information of that region. Additionally, the recording engine 119 may record a type of modulation 156 at the one or more frequency channels, such as, a pulse modulation. Moreover, the recording engine 119 may plot an updated location 158 of the controller 110 on a map 157 and send the information to another server for tracking, such as fleet tracking. For example, by tracking a position of the moving entity 102, along with other moving entities in a fleet, other moving entities in a fleet may update radio behaviors and/or navigation paths to be consistent with one another.

The network/user traffic behavior updating engine 198 may modify network traffic, or transmission of data packets, on a level of an individual user of any of the access points 120, 122, 124, and 126 from the updated location data. For example, as a location is changing, the network/user traffic behavior updating engine 198 may perform intent-based analysis on each individual user to determine data that is likely determine data that is likely to be relevant to a user at a current location, and perform Quality of Service (QoS) treatments on data that is more likely to be relevant at a particular location. The QoS treatments may include transmitting the data inferred to be more relevant at a faster rate or reducing a probability that the data would be dropped due to insufficient buffering resources. The network/user traffic behavior updating engine 198 may identify and categorize network traffic into classes. The categories may depend on any of suitable criteria such as an IP Precedence Value, a differentiated services code point (DSCP) value, class of service (CoS) value, source and destination MAC addresses, input interface, or protocol type. The categorization of the network traffic may be based at least in part on a current location. QoS policies or other treatments may be applied to the network traffic based on the categorization of the network traffic.

The network/user traffic behavior updating engine 198 may also modify network traffic, or transmission of data packets, in accordance with internal security policies associated with the mobile network itself. For example, the network/user traffic behavior updating engine 198 may monitor and infer potential outside attacks on the mobile network, based on a baseline user behavior for each individual user at any of the access points 120, 122, 124, and 126. Thus, if a request for traffic deviates by more than a threshold form the baseline user behavior, the network/user traffic behavior updating engine 198 may infer a potential outside attack and refrain from sending the requested traffic. The baseline user behavior may be determined based on a current location. For example, if the moving entity 102 is approaching a port, a user may tend to request certain types of data such as transportation or weather information at that particular port, whereas if the moving entity 102 is more than a threshold distance from the port, that user may be more likely to request certain types of data such as news rather than information that is specific to a particular location.

The traffic behavior updating engine 199 may dynamically update levels, distributions, and/or types of traffic permitted through the access points 120, 122, 124, and/or 126 based on changing privacy requirements in different territories such as General Data Protection Regulation (GDPR) or local requirements, such as geographic restrictions on content due to licensing. The traffic behavior updating engine 199 may also update firmware on the access points 120, 122, 124, and/or 126. The traffic behavior updating engine 199 may further restrict certain types of data from being processed and/or stored by various engines of the hardware processor(s) 115, such as the location updating engine 116, the radio behavior updating engine 117, the navigating engine 118, and/or the recording engine 119. For example, one or more of the hardware processor(s) 115 may restrict certain types of data such as dynamic IP addresses or MAC addresses from being stored and/or processed in one or more engines of the hardware processor(s) 115, or may require certain types of restricted data to be hashed or encrypted.

Figure 2:
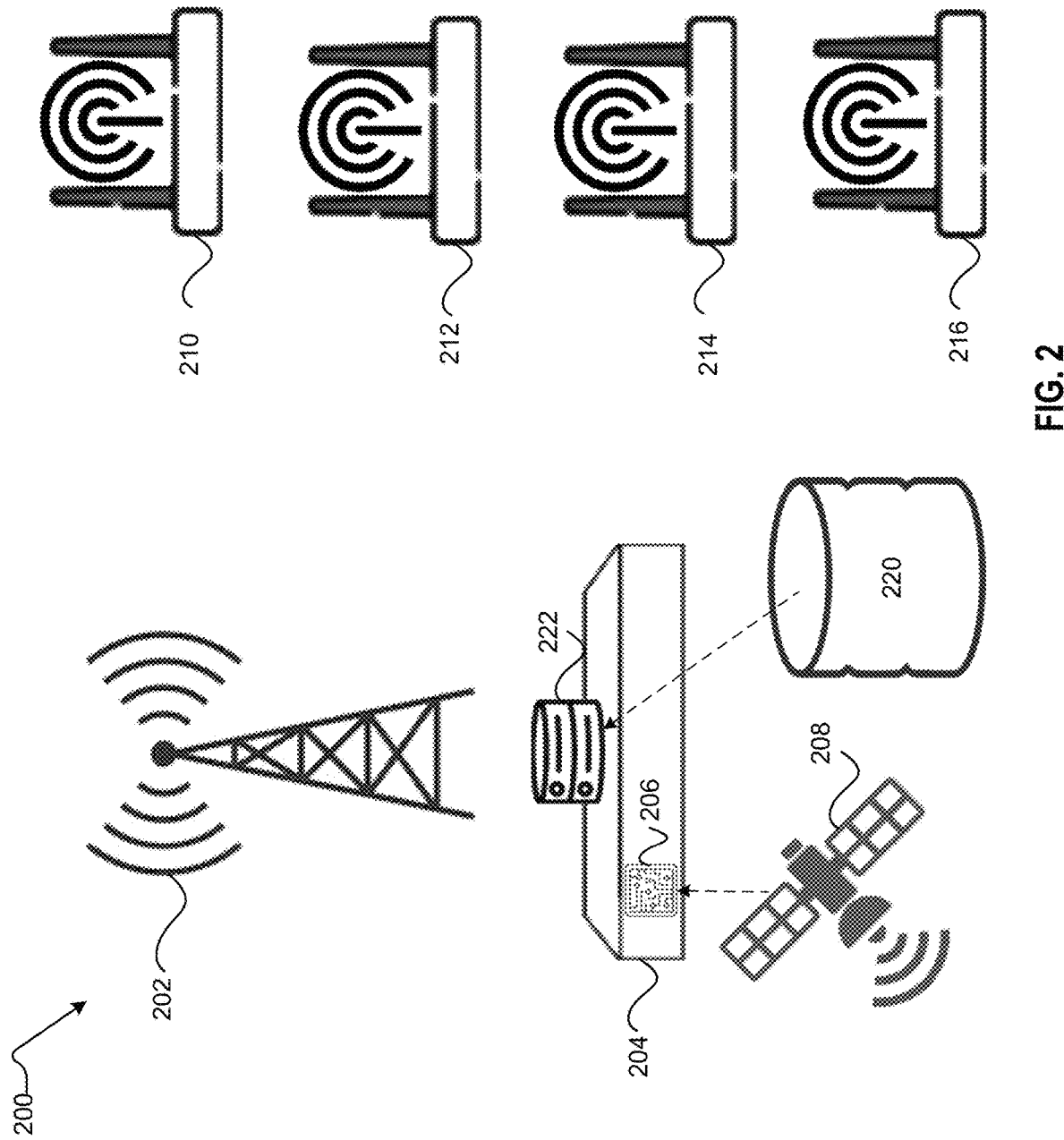
FIG. 2 is an exemplary illustration of a computing system that receives dynamically updated location data.

FIG. 2 illustrates an exemplary environment 200 of an automated frequency coordination (AFC) network, which allocates usage of the 6 GHz band, including four sub bands: 5925-6425 MHz, 6425-6525 MHz, 6525-6825 MHz, and 6875-7125 MHz. The AFC network includes an AFC system 202, a controller 204 of the AFC system, an embedded chip 206 that obtains location data of the controller as well as access points 210, 212, 214, and 216, from an external source or receiver such as a satellite 208 or an edge device such as a managed edge device. The external receiver may include a navigation system including GPS, Galileo, other satellite based systems, and/or an inertial navigation system (INS). In other examples, instead of using the embedded chip 206, the controller 204 may obtain location data in a wireless manner, such as via a serial connection, or in a wired manner. Because the access points 210, 212, 214, and 216 may already have location data themselves, the controller 204 may further determine a secondary source of the location data. Such a secondary source may be a sanity check and be utilized in an event of the access points 210, 212, 214, and 216 being unable to obtain location data. Additionally, in such an event, having a source of truth of the location data from the controller 204 may provide the access points 210, 212, 214, and 216 a faster technique to troubleshoot and restore the ability to obtain location data at the access points 210, 212, 214, and 216 themselves. Additionally, the controller 204 may act as a local data source of AFC data by caching locally relevant data in a cache 222, such as location data of the access points 210, 212, 214, and 216, from a master AFC database 220. In a scenario of limited bandwidth to the master AFC database 220, locally relevant data can be obtained more quickly in the cache 222 from the controller 204.

The controller 204 may, based on the determined locations of the access points 210, 212, 214, and 216, allocate one or more frequencies to the access points 210, 212, 214, and 216. Each of the access points may determine their respective locations using GPS, triangulation, and/or Galileo, to name some examples.

In some embodiments, the controller 204 may include a computing component, one or more hardware processors and machine-readable storage media storing a set of machine-readable/machine-executable instructions that, when executed, cause the hardware processor(s) to perform functions described previously. In some embodiments, the controller 204 may be implemented as the controller 110 as described in FIGS. 1A-1E.

Figure 3:
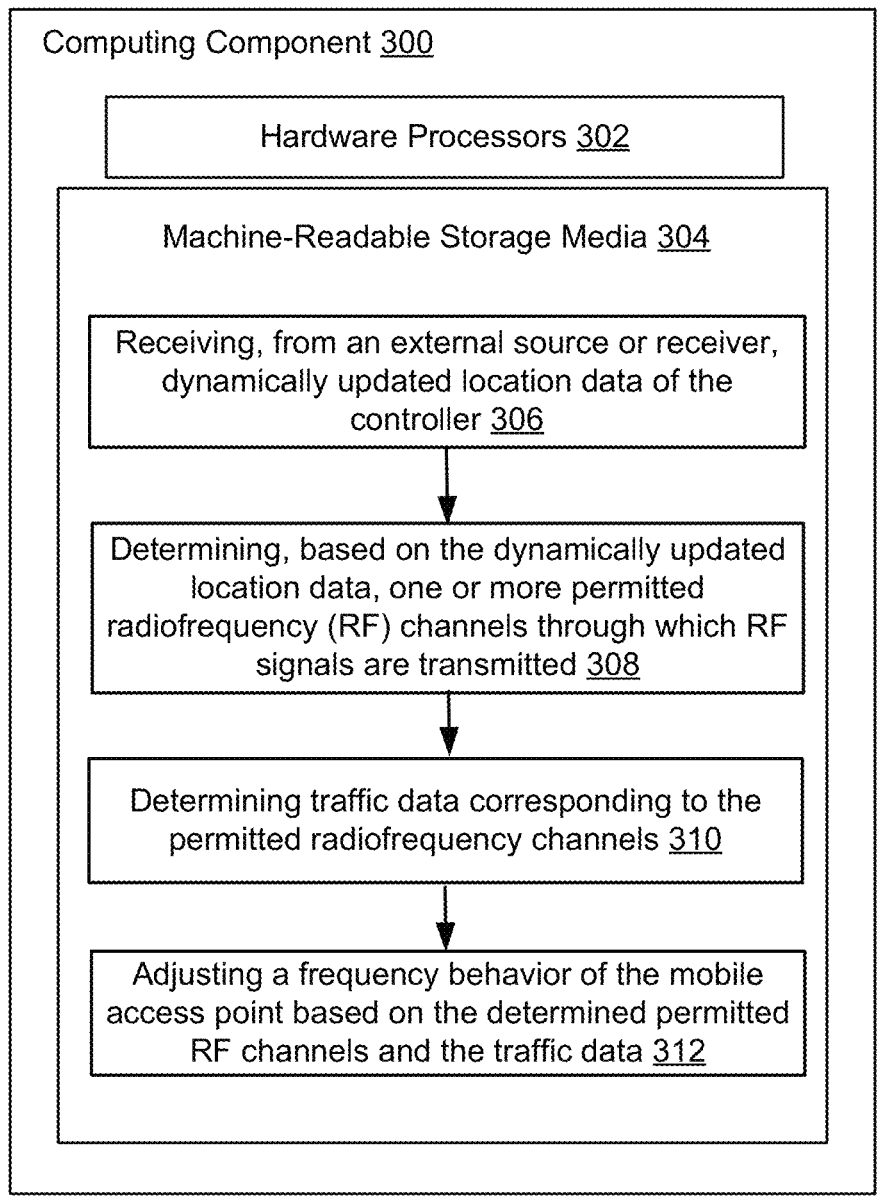
FIGS. 3-5 are exemplary flowcharts, according to embodiments described in the present disclosure.

FIG. 3 illustrates a computing component 300 that includes one or more hardware processors 302 and machine-readable storage media 304 storing a set of machine-readable/machine-executable instructions that, when executed, cause the hardware processor(s) 302 to perform an illustrative method of regulating a frequency behavior of mobile access point(s). It should be appreciated that there can be additional, fewer, or alternative steps performed in similar or alternative orders, or in parallel, within the scope of the various embodiments discussed herein unless otherwise stated. The computing component 300 may be implemented as the computing component 114 of FIGS. 1A-1E. The machine-readable storage media 404 may include suitable machine-readable storage media described in FIG. 6.

At step 306, the hardware processor(s) 302 may execute machine-readable/machine-executable instructions stored in the machine-readable storage media 304 to receive, from an external source or receiver, dynamically updated location data of the controller. The dynamically updated location data comprises a longitude, a latitude, and an altitude. The external source or receiver may include GPS, Galileo, other satellite based systems, and/or an INS. The dynamically updated location data may be obtained from multiple sources so that if one source goes down, location data can still be obtained from another source. Next, at step 308, the hardware processor(s) 302 may determine, based on the dynamically updated location data, one or more permitted radiofrequency (RF) channels through which RF signals are transmitted from one or more mobile access points associated with the mobile network. The permitted RF channels may be based on regulations, and/or RF channels that would not cause an interference exceeding a threshold amount if used to transmit RF signals. At step 310, the hardware processor(s) 302 may determine traffic data corresponding to the permitted radiofrequency channels. At step 312, the hardware processor(s) 302 may adjust respective frequency behaviors of the one or more mobile access points based on the determined permitted RF channels and the traffic data.

As an exemplary illustration, the controller may constitute a portion of a vehicle. The adjusting the respective frequency behaviors of the one or more mobile access points may further be based on a distance between the controller, at a location indicated by the dynamically updated location data, and a nearest port, docking station, or landing station of the vehicle, where other wireless networks are more likely to exist and cause interference. In some embodiments, the adjusting respective frequency behaviors of the one or more mobile access points may entail terminating signal transmission in a frequency channel that was previously transmitting RF signals in a subset of the one or more mobile access points, for example, because continuing to transmit signals in that frequency channel may cause excessive interference, or because that frequency channel is no longer permitted by regulation as a result of the vehicle crossing into a new territory. In some embodiments, the adjusting a frequency behavior of a mobile access point entails decreasing a signal transmission power of a subset of the one or more mobile access points based on a probability of RF signals from that mobile access point causing interference at a location indicated by the dynamically updated location data. The probability of RF signals from that mobile access point causing interference may be determined based on a relative location of that mobile access point and/or an amount of shielding around that mobile access point. For example, if that mobile access point is in a hermetic interior of a vehicle, that mobile access point would likely be shielded and not be likely to cause interference, so a signal transmission power would not need to be decreased. However, if a mobile access power has a minimal amount of shielding (e.g., below a threshold amount), such as on an exterior of the vehicle, the signal transmission power would likely need to be decreased or shut off to avoid interference. In some embodiments, if the controller constitutes a portion of a vehicle, the hardware processor(s) 302 may additionally adjust a navigation path of the vehicle based on the determined permitted RF channels and the traffic data, for example, to avoid strict RF regulations and/or interference. The hardware processor(s) 302 may additionally adjust a navigation path if a number of access points is high, such that changing a frequency behavior of a subset of the one or more mobile access points would result in at least some of the mobile access points being unable to connect to a network. In some embodiments, the hardware processor(s) 302 may transmit the dynamically updated location data to the one or more mobile access points. The one or more mobile access points may determine their respective locations based on relative distance and/or orientations between the mobile access points and the controller.

Figure 4:
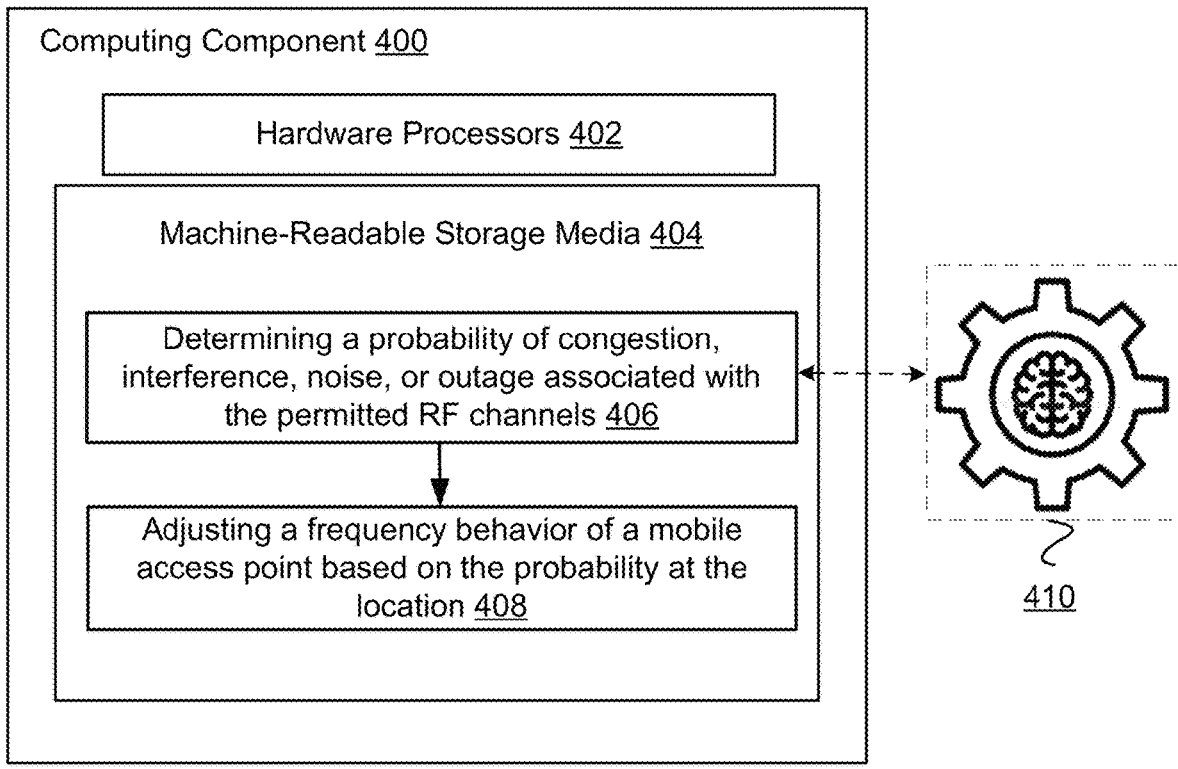

FIG. 4 illustrates a computing component 400 that includes one or more hardware processors 402 and machine-readable storage media 404 storing a set of machine-readable/machine-executable instructions that, when executed, cause the hardware processor(s) 402 to perform an illustrative method of regulating frequency behavior(s) of mobile access point(s). It should be appreciated that there can be additional, fewer, or alternative steps performed in similar or alternative orders, or in parallel, within the scope of the various embodiments discussed herein unless otherwise stated. The computing component 400 may be implemented as the computing component 114 of FIGS. 1A-1E. The machine-readable storage media 404 may include suitable machine-readable storage media described in FIG. 6. The steps or decisions of FIG. 4 provide a further example or elaboration of steps 310 and 312 from FIG. 3.

At step 406, the hardware processor(s) 402 may execute machine-readable/machine-executable instructions stored in the machine-readable storage media 404 to determine, based on the traffic data, a probability of congestion, interference, noise, and/or outage associated with the one or more permitted RF channels at a location indicated by the dynamically updated location data. As indicated in FIG. 4, the probability may be determined by a machine learning model 410, which may be trained and supervised as described with respect to FIG. 1B. The machine learning model 410 may be trained by historical data of traffic data and/or frequencies of congestion, interference, noise, and/or outage at particular locations. Feedback regarding an accuracy of the determined probability may be provided to the machine learning model 410 to further train and improve the machine learning model 410 over time.

At step 408, the hardware processor(s) 402 may execute machine-readable/machine-executable instructions stored in the machine-readable storage media 404 adjust frequency behavior(s) of mobile access point(s) based on the probability of congestion, interference, noise, or outage at the location. For example, if the probability of interference in a certain frequency range is higher than a threshold, the controller 400 may terminate broadcasting in certain RF frequencies.

Figure 5:
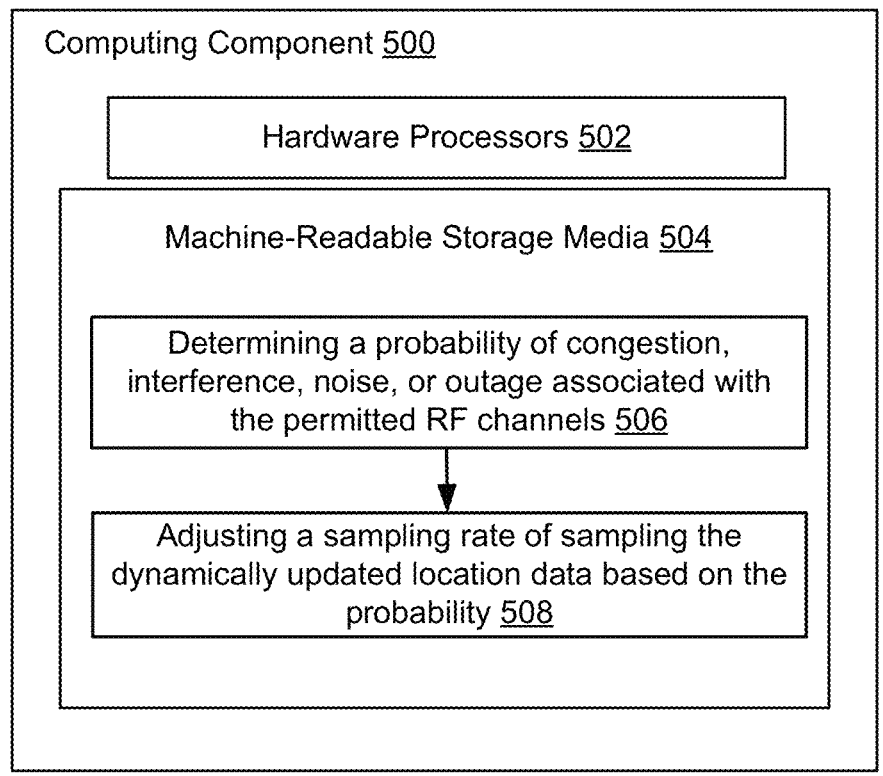

FIG. 5 illustrates a computing component 500 that includes one or more hardware processors 502 and machine-readable storage media 504 storing a set of machine-readable/machine-executable instructions that, when executed, cause the hardware processor(s) 502 to perform an illustrative method of regulating frequency behavior(s) of mobile access point(s). It should be appreciated that there can be additional, fewer, or alternative steps performed in similar or alternative orders, or in parallel, within the scope of the various embodiments discussed herein unless otherwise stated. The computing component 500 may be implemented as the computing component 114 of FIGS. 1A-1E. The machine-readable storage media 504 may include suitable machine-readable storage media described in FIG. 6. The steps or decisions of FIG. 5 provide a further example of step 306 from FIG. 3.

At step 506, the hardware processor(s) 502 may execute machine-readable/machine-executable instructions stored in the machine-readable storage media 504 to determine, based on the traffic data, a probability of congestion, interference, noise, and/or outage associated with the one or more permitted RF channels at a location indicated by the dynamically updated location data. At step 508, the hardware processor(s) 502 may adjust a sampling rate of sampling the dynamically updated location data based on the probability of congestion, interference, noise, or outage in the one or more permitted RF channels at the location. For example, if the probability of interference is above a threshold at a particular location, the sampling rate may be increased because obtaining up-to-date location data may be especially important to successfully avoiding interference. The adjustment of RF transmission behaviors may be frequent or rapid at that particular location.

Figure 6:
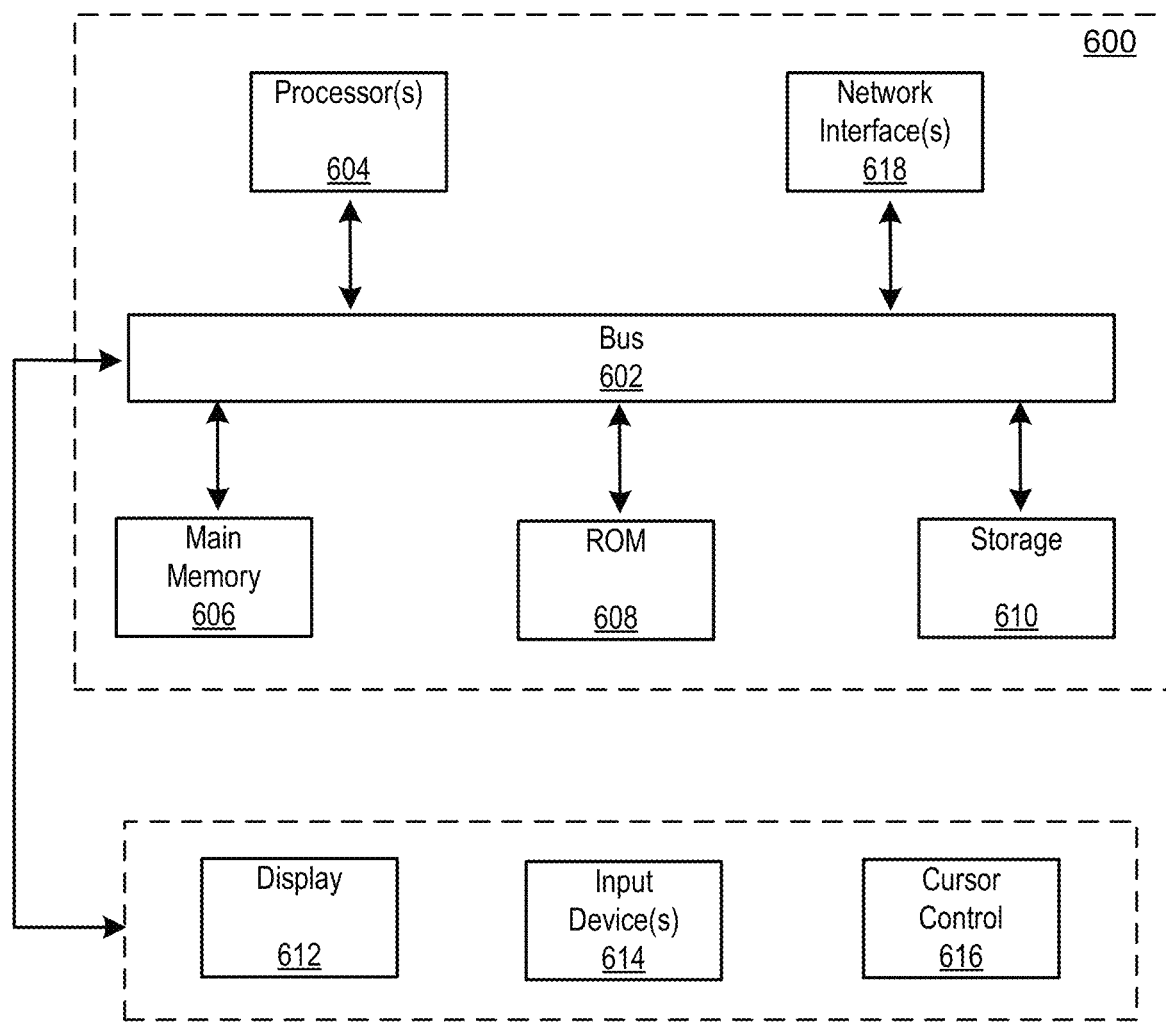
FIG. 6 is an example computing component that may be used to implement various features of embodiments described in the present disclosure.

FIG. 6 depicts a block diagram of an example computer system 600 in which various of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "engine," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method of a controller of a mobile network, comprising:
   receiving, from an external source or receiver, dynamically updated location data of the controller, at an infrastructural level of the mobile network;
   determining a first regulation associated with a particular location is associated with the dynamically updated location data, wherein the first regulation comprises a local privacy law in accordance with the dynamically updated location data;
   determining, based on the dynamically updated location data and the first regulation, one or more permitted radiofrequency (RF) channels through which RF signals are transmitted from a mobile access point associated with the mobile network and traffic data corresponding to the permitted RF channels;
   determining that the first regulation associated with the particular location is replaced by a second regulation;
   identifying a permitted channel of the one or more permitted RF channels comprising an updated RF channel based on the second regulation; and
   adjusting a frequency behavior of the mobile access point based on the permitted RF channels associated with the second regulation and the traffic data.

2. The computer-implemented method of claim 1, wherein the adjusting of the frequency behavior of the mobile access point is further based on a distance between the controller, at a location indicated by the dynamically updated location data, and a nearest port, docking station, or landing station.

3. The computer-implemented method of claim 1, further comprising:
   determining, based on the traffic data, a probability of congestion, interference, noise, or outage associated with the one or more permitted RF channels at a location indicated by the dynamically updated location data; and wherein:
   the adjusting the frequency behavior of the mobile access point is further based on the probability of congestion, interference, noise, or outage at the location.

4. The computer-implemented method of claim 3, wherein the probability of congestion, interference, noise, or outage is determined by a machine learning model, the machine learning model being trained by a first dataset including historical data related to congestion, interferences, noise, usage, or outage of frequency channels at particular locations, and a second training dataset including trends or cyclical patterns of the historical data at the particular locations.

5. The computer-implemented method of claim 1, wherein the adjusting of the frequency behavior of the mobile access point comprises terminating signal transmission in a frequency channel that was previously transmitting RF signals.

6. The computer-implemented method of claim 1, wherein the adjusting of the frequency behavior of the mobile access point comprises decreasing a signal transmission power of the mobile access point based on a probability of RF signals from the mobile access point causing interference at a location indicated by the dynamically updated location data.

7. The computer-implemented method of claim 1, wherein the controller is disposed in a vehicle; and the method further comprises:
   updating a navigation path of the vehicle based on the determined permitted RF channels and the traffic data.

8. The computer-implemented method of claim 1, further comprising:
   transmitting the dynamically updated location data to the mobile access point.

9. The computer-implemented method of claim 1, wherein the dynamically updated location data comprises a longitude, a latitude, and an altitude.

10. The computer-implemented method of claim 1, wherein the method further comprises:
    determining, based on the traffic data, a probability of congestion, interference, noise, or outage associated with the one or more permitted RF channels at a location indicated by the dynamically updated location data; and
    adjusting a sampling rate of sampling for the dynamically updated location data, at the infrastructural level of the mobile network, based on the probability of congestion, interference, noise, or outage in the one or more permitted RF channels at the location.

11. The computer-implemented method of claim 1, further comprising:
    determining, based on the dynamically updated location data, requirements of General Data Protection Regulation (GDPR); and
    reconfiguring the mobile access point to restrict a transmission of one or more types of traffic that fails to comply with the requirements of GDPR.

12. A computing system that controls a mobile network, the computing system comprising:
    one or more processors; and
    a memory storing instructions that, when executed by the one or more processors,
    cause the one or more processors to perform:
      receiving, from an external source or receiver, dynamically updated location data of a controller of a mobile network;
      determining a first regulation associated with a particular location is associated with the dynamically updated location data, wherein the first regulation comprises a local privacy law in accordance with the dynamically updated location data;
      determining, based on the dynamically updated location data and first regulation, one or more permitted radiofrequency (RF) channels through which RF signals are transmitted from a mobile access point associated with the mobile network and traffic data corresponding to the permitted RF channels;
      determining that the first regulation associated with the particular location is replaced by a second regulation;
      identifying a permitted channel of the one or more permitted RF channels comprising an updated RF channel based on the second regulation; and
      adjusting a frequency behavior of the mobile access point based on the permitted RF channels associated with the second regulation and the traffic data.

13. The computing system of claim 12, wherein the adjusting of the frequency behavior of the mobile access point is further based on a distance between the controller, at a location indicated by the dynamically updated location data, and a nearest port, docking station, or landing station.

14. The computing system of claim 12, wherein the instructions further cause the one or more processors to perform:
    determining, based on the traffic data, a probability of congestion, interference, noise, or outage associated with the one or more permitted RF channels at a location indicated by the dynamically updated location data; and wherein:
    the adjusting the frequency behavior of the mobile access point is further based on the probability of congestion, interference, noise, or outage at the location.

15. The computing system of claim 14, wherein the probability of congestion, interference, noise, or outage is determined by a machine learning model, the machine learning model being trained by a first dataset including historical data related to congestion, interferences, noise, usage, or outage of frequency channels at particular locations, and a second training dataset including trends or cyclical patterns of the historical data at the particular locations.

16. The computing system of claim 12, wherein the adjusting of the frequency behavior of the mobile access point comprises terminating signal transmission in a frequency channel that was previously transmitting RF signals.

17. The computing system of claim 12, wherein the adjusting of the frequency behavior of the mobile access point comprises decreasing a signal transmission power of the mobile access point based on a probability of RF signals from the mobile access point causing interference at a location indicated by the dynamically updated location data.

18. The computing system of claim 12, wherein the controller is disposed in a vehicle; and the instructions further cause the one or more processors to perform:
    updating a navigation path of the vehicle based on the determined permitted RF channels and the traffic data.

19. The computing system of claim 12, wherein the instructions further cause the one or more processors to perform:
    transmitting the dynamically updated location data to the mobile access point.

20. The computing system of claim 12, wherein the instructions further cause the one or more processors to perform:
    determining, based on the traffic data, a probability of congestion, interference, noise, or outage associated with the one or more permitted RF channels at a location indicated by the dynamically updated location data; and adjusting a sampling rate of sampling for the dynamically updated location data based on a probability of congestion, interference, noise, or outage in the one or more permitted RF channels at the location.

* * * * *